April 18, 1939. E. S. PEARCE 2,154,916
JOURNAL BEARING
Filed Nov. 5, 1936 4 Sheets-Sheet 1

INVENTOR
Edwin S. Pearce
BY
ATTORNEYS

April 18, 1939.  E. S. PEARCE  2,154,916
JOURNAL BEARING
Filed Nov. 5, 1936    4 Sheets-Sheet 2

INVENTOR
Edwin S. Pearce
BY
ATTORNEYS

April 18, 1939.  E. S. PEARCE  2,154,916
JOURNAL BEARING
Filed Nov. 5, 1936  4 Sheets-Sheet 3

April 18, 1939.  E. S. PEARCE  2,154,916
JOURNAL BEARING
Filed Nov. 5, 1936   4 Sheets-Sheet 4
Fig. 9.
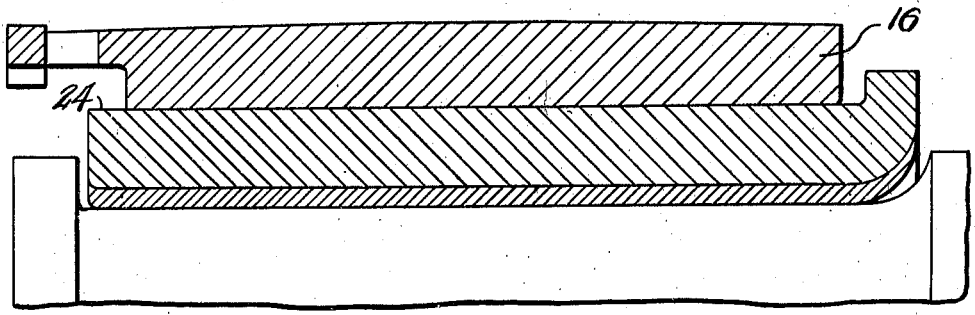
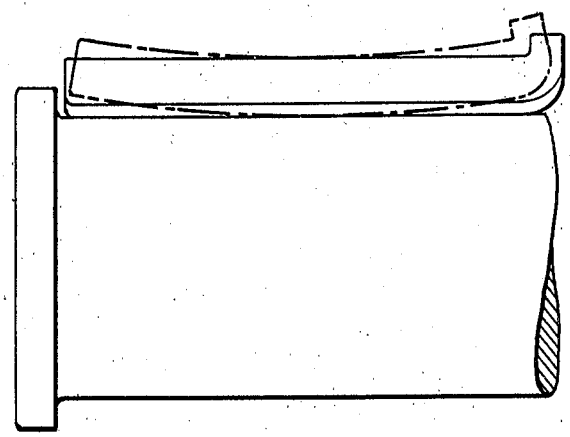
Fig. 10.
Fig. 11.
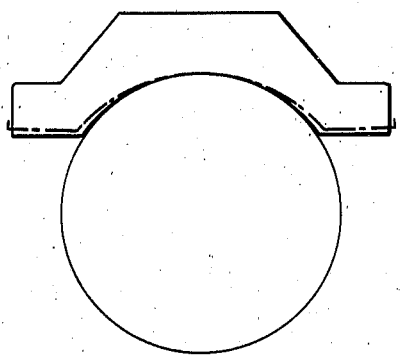
INVENTOR
Edwin S. Pearce
BY
Synnestvedt & Lechner
ATTORNEYS Patented Apr. 18, 1939

2,154,916

UNITED STATES PATENT OFFICE 2,154,916

JOURNAL BEARING

Edwin S. Pearce, Indianapolis, Ind., assignor to Railway Service & Supply Corporation, Indianapolis, Ind., a corporation of Indiana Application November 5, 1936, Serial No. 109,215

8 Claims. (Cl. 308—54)

This invention relates to journal bearings such, for example, as are employed in connection with the axles of railway vehicles. Specifically the invention has been developed for railway car journals, but it should be understood that the invention is not to be limited to this type of service because the principles involved are equally applicable to other types of journal bearings.

The primary object of the invention is to greatly improve the operating characteristics of a bearing of this general type so as to reduce to a minimum the possibility of failure in service.

More specifically stated, the objects of the invention include the provision of means for preventing the unit load at operating temperatures from exceeding the yield point of the bearing lining metal; the provision of means for avoiding locally high concentration of load; the provision of a structure which will ensure uniform lubrication of the entire bearing area; the provision of means whereby warping of the bearing in service will be avoided; and the provision of structure whereby the bearing can be operated under lower unit loads at operating temperatures and without localized areas of excessively high unit loading and temperature.

How the foregoing objects, together with such other objects as may appear hereinafter or are incident to my invention, are attained will be apparent from the following description of the accompanying drawings, but before proceeding with this description it is believed that the invention will be better understood by first briefly referring to certain fundamental facts relating to this art.

In operation there is, of course, a certain degree of friction between the surface of an axle journal and its bearing, which friction must necessarily be converted into heat and the degree of heat and consequently the temperature of the bearing varies with the physical and chemical condition of the rubbing surfaces, the supply of lubricant— both as to its quality and its quantity—and also and directly as the unit load on and the surface speed of the journal.

In considering the unit loading of a journal bearing, it has been the universally accepted practice to divide the total load on the bearing by the projected area of the bearing on the journal and thereby obtain a loading expressed in lbs. per square inch. For example, a standard 5½" x 10" journal bearing carrying a total load of 16,375 lbs. and having a crown bearing which is 2½" wide and 9" long, or an area of 22.5 square inches, has been considered as carrying a unit load of approximately 728 lbs. per sq. in.

In connection with the development of the present invention, however, research has demonstrated that the foregoing assumption, if true, can exist only when the journal is in a static condition and at relatively low temperatures as related to the ambient temperature as a minimum, and this for the reason that as the temperature of the bearing rises in service it has a tendency to warp or curve upwardly not only along its longitudinal axis but also transversely of the bearing. This warping, of course, produces a high concentration of load and excessive heating in a localized area, and this to such a degree that the unit loading at operating temperatures often rises far beyond the "yield" point and/or the "ultimate strength in compression" of the lining metal used in the bearing, so that a bearing failure results.

With the foregoing in mind, it might be pointed out that my invention contemplates the provision of structure whereby the load on the bearing is distributed in such a way as to minimize and even to eliminate entirely the warping or distortion of the bearing above referred to.

In the accompanying drawings:

Figure 9 is a partial longitudinal section similar to the section of Figure 1 but illustrating the old style bearing familiar to the art;

Figure 10 is a more or less diagrammatic illustration showing in exaggerated degree for the sake of clearness, the type of longitudinal warping or distortion which develops in the bearings of the old type shown in Figure 9, and Figure 11 is an end view showing the transverse warping or distortion also in exaggerated degree, developed in the old type bearings.

Figure 1:
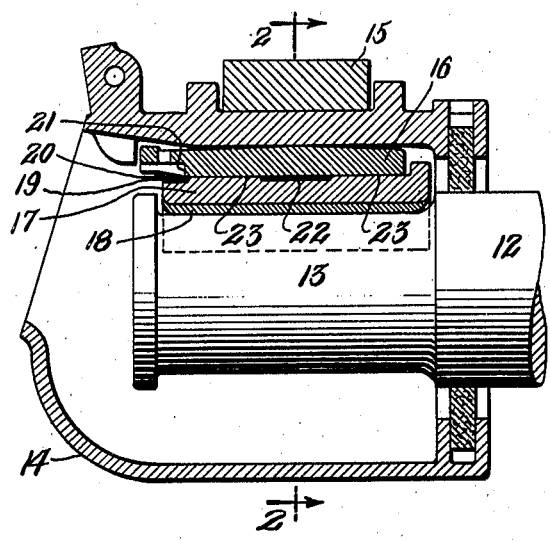
Figure 1 is a vertical longitudinal section through a car journal axle box illustrating my improvements applied thereto.
Figure 2:
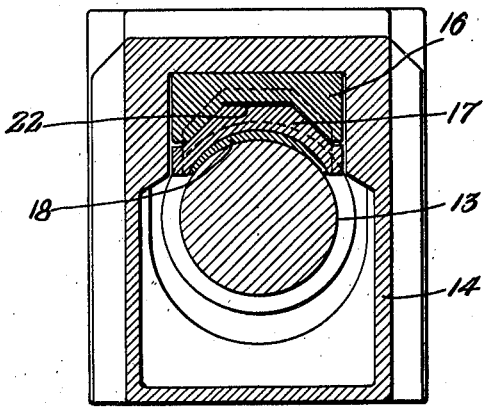
Figure 2 is a section on the line 2—2 of Figure 1.

Referring, first, to Figures 1 and 2, it will be seen that I have illustrated a car axle 12 with its journal 13 projecting into the journal box 14. The side frame 15 of the car truck is carried on top of the box in the customary manner and, as is well known, the load is transmitted by this frame to the box and from the box to the usual wedge 16, which, in turn, rests upon my improved bearing 17 lined with some suitable form of bearing metal 18. The wedge is of standard construction and, as is customary in this art, its upper face is curved slightly, as shown, to permit vertical rocking movements of the axle, although the load transmitting surfaces of the box and the wedge might be otherwise interrelated to accomplish the same purpose. This standard wedge construction results in a central load bearing region with an unloaded region at each end as shown in drawings.

Figure 4:
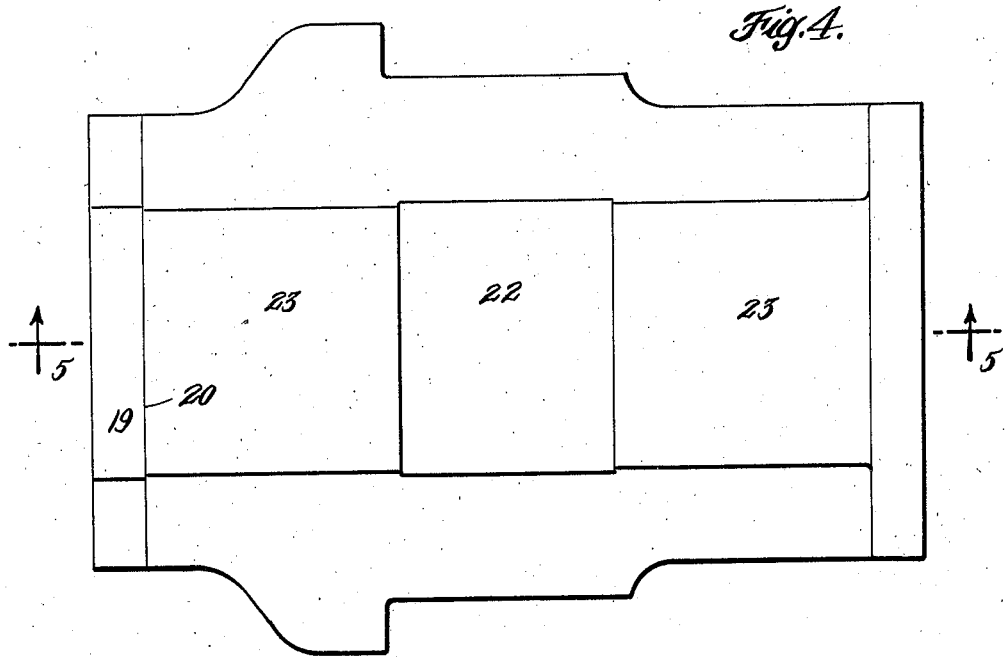
Figure 4 is a plan view of my improved bearing.
Figure 5:
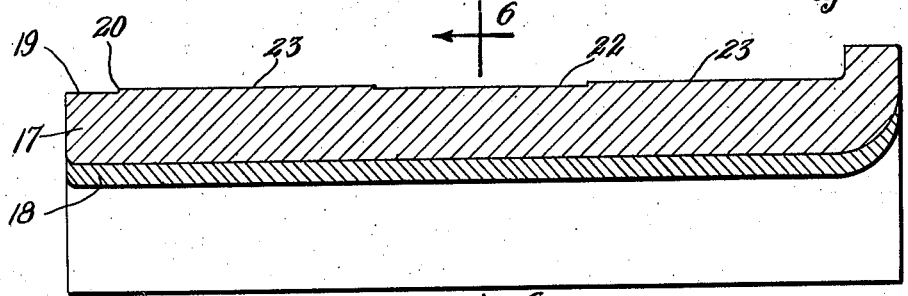
Figure 5 is a section on the line 5—5 of Figure 4.
Figure 6:
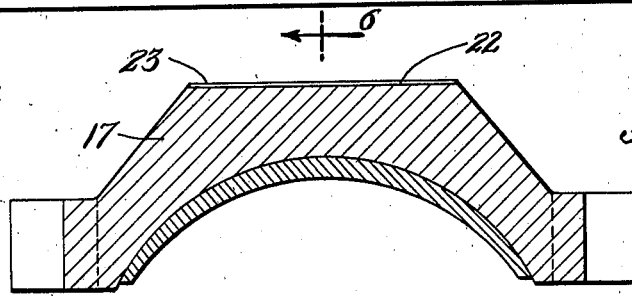
Figure 6 is a section on the line 6—6 of Figure 5.

In attaining the objects of my invention I prefer to construct the bearing 17 in the manner illustrated in detail in Figures 4, 5 and 6, upon inspection of which it will be seen that the upper face of the bearing is cut away at its outer end to form the shoulder 19. The cut-away portion extends toward the center of the bearing a sufficient distance so that its back 20 is approximately "line on line" with the adjacent edge 21 on the wedge 16. However, the shoulder 19 could be extended somewhat farther in if so desired, the important consideration being that the edge 20 shall at no time during service extend beyond the adjacent edge 21 of the wedge, so that the edge 21 cannot cut into the upper face of the bearing. In this connection it should be recalled that bearings of this type are generally made of metal which is softer than the metal of the wedge 16 and that during service, because of the heat developed, considerable expansion and contraction takes place so that there is relative motion between the upper surface of the bearing and the under surface of the wedge. Additionally, there is, of course, the usual degree of relative motion between the bearing and the wedge due to the longitudinal movements of the axle in the box during normal running conditions. In the proper development and realization of my invention such relative motion should in no way be interfered with, as it would be were the edge 20 to extend beyond the edge 21.

The remaining portion of the upper face of my improved bearing is centrally relieved or cut away as at 22, so as to provide a pair of spaced load receiving areas 23, one at each end of the bearing. The length of the relieved portion 22 in a direction longitudinally of the axle may be varied to suit individual conditions in accordance with the principles to be discussed hereinbelow, but it might be stated at the present time that the size of this relieved area should be so proportioned with respect to the load receiving areas 23 as to result in a unit loading for the bearing which, at operating temperatures, will at no time exceed the "yield point" and/or the "ultimate strength in compression" of the particular type of bearing metal lining which may be used.

Figure 3:
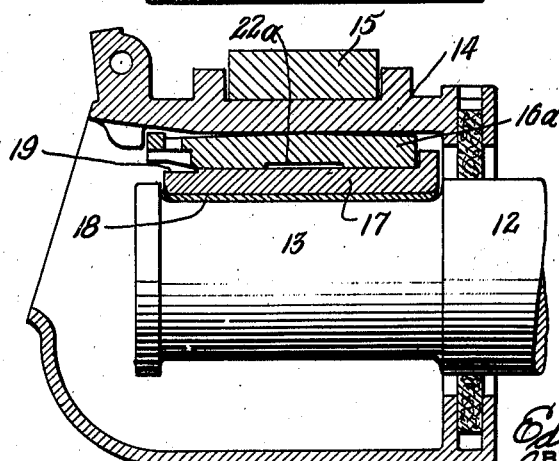
Figure 3 is a section similar to that of Figure 1 but illustrating a modification of the invention.

In Figure 3 the under face of the wedge 16a is relieved as at 22a instead of the upper face of the bearing, although the upper face of the bearing must be cut back as at 19 in a manner similar to that illustrated and described in connection with Figures 1 and 2. In a sense this is a mere reversal of the construction shown in Figures 1 and 2, but, as a practical matter, I prefer to provide the spaced load receiving areas in the manner discussed in connection with Figures 1 and 2 rather than in the manner illustrated in Figure 3.

I have found that by providing a structure in which the load is transmitted through such spaced bearing areas, it is possible to eliminate or at least to greatly minimize the troublesome warping with all of its consequent problems which has heretofore been characteristic of the old style bearings known to the art, which have a perfectly flat upper face 24 as shown in Figure 9, which face contacts throughout its length with the corresponding under face of the wedge 16. This old type of bearing has a tendency to warp upwardly at its ends as shown in Figure 10, as well as at its sides as shown in Figure 11, and of the two types of warping the longitudinal warping is far more serious because it tends to localize the load in the center of the bearing while the transverse warping simply narrows the bearing area toward the crown of the bearing. The longitudinal warping permits oil to by-pass through the low pressure areas toward the ends of the bearing, so that the central portion which is carrying the load becomes hotter and hotter until the unit load exceeds the "yield point" of the bearing metal lining and failure results.

By providing a structure in accordance with my invention the load itself acts to counteract or eliminate the detrimental warping referred to, so that all portions of the bearing are adequately lubricated under all normal operating conditions.

Figure 7:
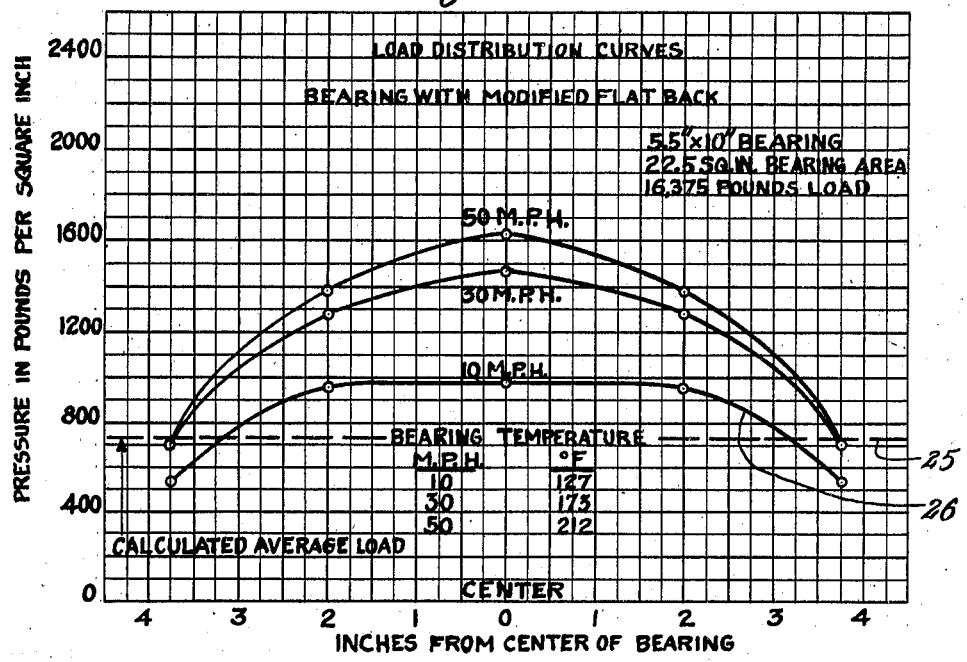
Figure 7 is a graph illustrating characteristic load distribution curves which are possible with my improved bearing.
Figure 8:
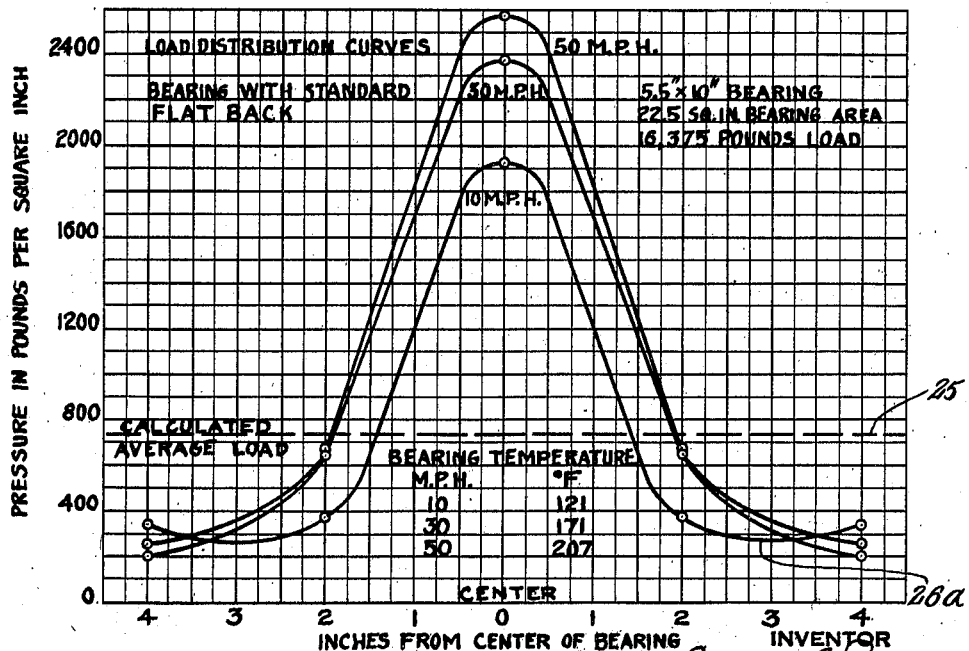
Figure 8 is a graph similar to the graph of Figure 7 but illustrating characteristic load distribution curves which have heretofore obtained in connection with the old style bearings known to the art.

In order to demonstrate the marked improvement which is made possible with my improved structure, reference should be made to the graphs of Figures 7 and 8 which are plotted to the same vertical and horizontal scale, Figure 7 representing the curves obtained with my improved bearing, and Figure 8 the curves obtained with an old style bearing. In both of these figures the calculated average unit load on the bearing is shown as a straight line 25 and is approximately 728 lbs. per sq. in.

In Figure 7 which represents my improved bearing, the curve 26 was obtained at ten miles per hour, at which the bearing temperature, as indicated, was 127° F. The corresponding curve 26a in Figure 8, which represents the old style bearing, shows that the unit loading at the center of the bearing goes sharply upward to a maximum of approximately 1920 lbs. per sq. in. as against a maximum of approximately 980 lbs. per sq. in. with my improved bearing. Furthermore, the improved bearing shows a much flatter curve so that there is, comparatively speaking, no localized high pressure area at all.

Similar sharp contrasts between the two types of bearing are shown at 30 and at 50 miles per hour, but a detailed reference to the curves in question will not be included because it is believed that they are easily understood and read from the drawings in question, especially in the light of the legends appearing thereon.

To show the dangers involved in operating at the high unit loadings and at the corresponding bearing temperatures illustrated in Figure 8, attention is directed to the following facts. It is customary in the art to employ what is known as white metal alloy #5 in the construction of the bearing lining 18, and this material has a yield point of approximately 2250 lbs. per sq. in. at approximately 167° F. The graph of Figure 8 shows, therefore, that even at a speed of only 30 miles an hour this yield point is exceeded because at this speed the temperature of the bearing has already reached 171° F. and the unit loading has gone up to approximately 2380 lbs. per sq. in. This immediately creates a dangerous operating condition and failure of the bearing is imminent.

As contrasted with this, the graph of Figure 7, which shows the character of operation obtained with my improved bearing, indicates that at 30 miles per hour the unit loading has reached approximately only 1480 lbs. per sq. in. at a temperature of 173° F. Therefore, even though the bearing temperature is 2° higher with my improved bearing no damage will occur because the maximum unit load is so far below the maximum unit load obtained with the old style bearing. Furthermore, even at 50 miles per hour and at a bearing temperature of 212°, my improved structure makes it possible to keep the unit load well below the danger point while with the old style bearing the danger point at this speed is far exceeded as shown in the graph of Figure 8.

It will be clear from the foregoing that the size or longitudinal dimension of the depressed or relieved portion 22 of my bearing can be varied as may be suitable for any given set of conditions. The determining factor as to its size should be the relation between the maximum unit load per sq. in. and the yield point of the bearing metal lining which may be employed. Just so long as the maximum unit load per sq. in. does not exceed the yield point at maximum operating temperatures, uniform and thorough lubrication will be possible and the bearing will not fail.

I claim:

1. In a railway axle journal box, the combination of a wedge loaded in its central region but unloaded at its ends, and a crown bearing on the journal for receiving the load from said wedge, the journal contacting face of the bearing in the region of the crest being substantially uninterrupted throughout the longitudinal length of the bearing and the adjacent faces of the bearing and the wedge being formed so that the bearing receives its load through a pair of longitudinally spaced end areas with a relieved area therebetween, said longitudinally spaced end areas extending under the unloaded ends of the wedge and said relieved area extending under the centrally loaded region of the wedge.

2. The structure of claim 1 wherein the bearing is provided with a suitable bearing lining metal and wherein the longitudinally spaced load receiving areas of the bearing are proportioned in relation to the relieved area so that, at normal maximum operating temperatures, the unit load on the bearing lining metal will not exceed its yield point.

3. The structure of claim 1, wherein the upper face of the bearing is cut back at its outer end at least to a point in line with the adjacent edge of the wedge.

4. In a railway axle journal box, the combination of a wedge loaded in its central region but unloaded at its ends, and a crown bearing on the journal for receiving the load from said wedge, the journal contacting face of the bearing in the region of the crest being substantially uninterrupted throughout the longitudinal length of the bearing and the upper face of the bearing being formed to provide a pair of longitudinally spaced load receiving areas with a relieved area therebetween, said longitudinally spaced load receiving areas extending under the unloaded ends of the wedge and said relieved area extending under the centrally loaded region of the wedge.

5. The structure of claim 4 wherein the bearing is provided with a suitable bearing lining metal and wherein the longitudinally spaced load receiving areas of the bearing are proportioned in relation to the relieved area so that, at normal maximum operating temperatures, the unit load on the bearing lining metal will not exceed its yield point.

6. The structure of claim 4, wherein the upper face of the bearing is cut back at its outer end at least to a point in line with the adjacent edge of the wedge.

7. In a railway axle journal box, the combination of a wedge loaded in its central region but unloaded at its ends, and a crown bearing on the journal for receiving the load from said wedge, the journal contacting face of the bearing in the region of the crest being substantially uninterrupted throughout the longitudinal length of the bearing and the lower face of the wedge being formed to provide a pair of longitudinally spaced load transmitting areas with a relieved area therebetween, said longitudinally spaced load transmitting areas extending under the unloaded ends of the wedge and said relieved area extending under the centrally loaded region of the wedge.

8. A railway axle crown journal bearing for a journal box having a centrally loaded wedge, said bearing having its journal face lined with bearing metal, the crest of which face is substantially uninterrupted throughout the length of the lining and the wedge face of the bearing being centrally relieved so that it receives the load upon a pair of disconnected areas which are spaced apart longitudinally of the bearing, said load receiving areas being proportioned in relation to the relieved area so that, at normal maximum operating temperatures the unit load on the bearing lining metal will not exceed its yield point.

EDWIN S. PEARCE.

CERTIFICATE OF CORRECTION.

Patent No. 2,154,916.                                                  April 18, 1939.

EDWIN S. PEARCE.

It is hereby certified that error appears in the printed specification of the above numbered patent requiring correction as follows: Page 3, second column, line 59, claim 8, after the word and period "point." and before the signature of the inventor, insert the following as claim 9 -

9. The bearing of claim 8 wherein the upper face of the bearing is cut back at its outer end substantially as herein disclosed.;

and that the said Letters Patent should be read with this correction therein that the same may conform to the record of the case in the Patent Office.

Signed and sealed this 6th day of June, A. D. 1939.

Henry Van Arsdale (Seal)

Acting Commissioner of Patents.